(No Model.)
C. SEYBOLD.
VARIABLE SPEED FRICTION GEAR.
No. 546,060. Patented Sept. 10, 1895.
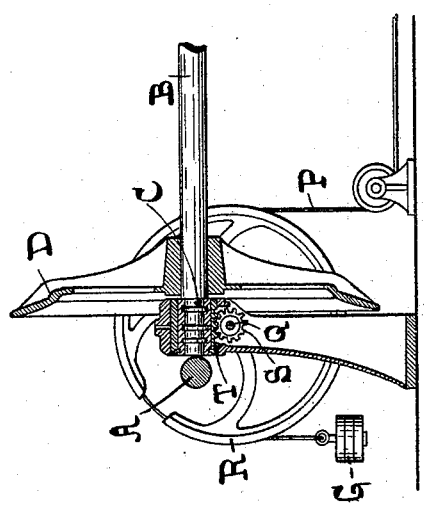
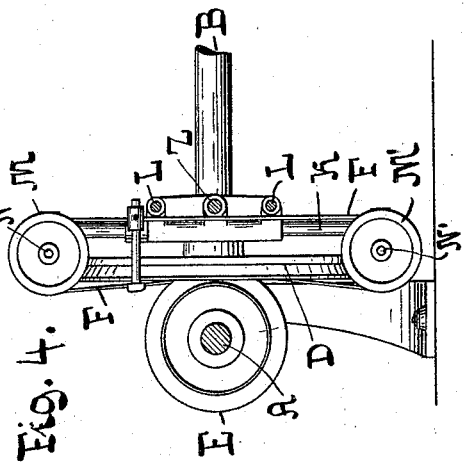
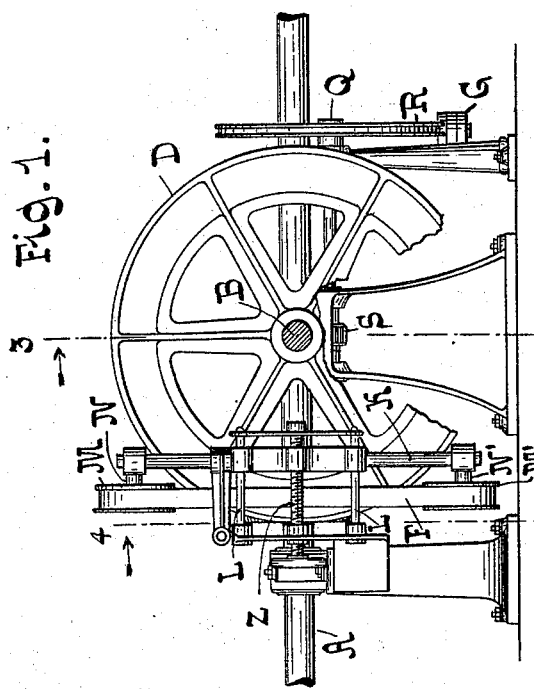
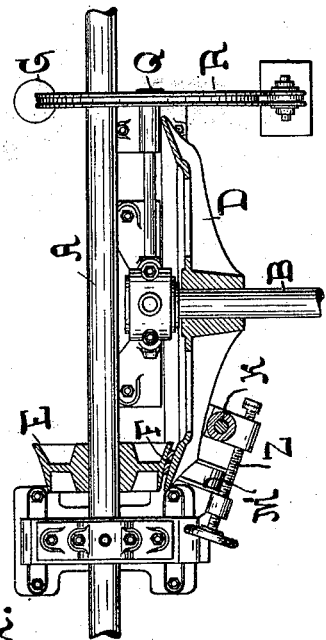
WITNESSES:
Jas. W. Thomas
Eugenie A. Persides
INVENTOR:
Christian Seybold,
BY
A. Faber du Faur
ATTORNEY

United States Patent Office.

CHRISTIAN SEYBOLD, OF ZWEIBRÜCKEN, GERMANY.

VARIABLE-SPEED FRICTION-GEAR.

SPECIFICATION forming part of Letters Patent No. 546,060, dated September 10, 1895.

Application filed May 8, 1895. Serial No. 548,566. (No model.)

*To all whom it may concern:*

Be it known that I, CHRISTIAN SEYBOLD, a subject of the Emperor of Germany, and a resident of Zweibrücken, in the Kingdom of Bavaria, Germany, have invented new and useful Improvements in Variable-Speed Friction-Gears, of which the following is a specification.

My invention has reference to friction-gearing, and especially to a variable friction-gear for shafts placed at an angle to each other.

It consists, essentially, in the combination of a concave-faced pulley placed on one of the shafts, a convex-faced pulley on the other shaft, an adjustable belt between the two pulleys, and means for pressing the face of one pulley toward the face of the other. Heretofore variable-speed friction-gears have been applied generally to parallel shafts, the application of such gearing to shafts placed at an angle to each other or crossing each other having the objectionable feature that the belt tends to run off the conical pulleys, and consequently both the belt and the belt-shifter are rapidly worn out.

The object of my present invention is, therefore, to so construct the pulleys of variable-speed friction-gearing that the tendency of the belt to run off is counteracted and the belt is practically self-guiding, to which end, as before stated, I slightly concave the face of one pulley and correspondingly convex the face of the second pulley.

The nature of my said invention will best be understood when described in connection with the accompanying drawings, in which—

Figure 1 represents a front elevation of an apparatus embodying my invention. Fig. 2 is a plan view, partly in section. Fig. 3 is a section on the line 3 3, Fig. 1. Fig. 4 is a section on the line 4 4, Fig. 1.

Similar letters of reference designate corresponding parts throughout the several views of the drawings.

In the drawings, the letter A designates a driving-shaft, from which a shaft, such as B, may be driven. The shaft B is provided with thrust-bearings C, which latter are adjustable in the direction of the length of the shaft. On the shaft B is mounted a pulley D, to which rotary motion is imparted by means of a belt F and a conical pulley E. The belt F passes between the pulleys D and E, and its position can be adjusted by any suitable means for the purpose of varying the speed of the driven pulley D. The pulley D is forced toward the driving-pulley E by any suitable means—such, for instance, as the weight G acting through suitable intermediate devices. In the present instance the weight G is suspended on a wheel R, which acts as a lever. Said wheel R is secured to a shaft Q, provided at one end with a gear S, meshing into a rack T on the thrust-bearing. A rope P is fastened to the wheel R, by means of which the wheel is turned in a direction opposite to that in which it is turned by the weight G, when the rope is drawn forward, thereby throwing the driven pulley D out of action. If the faces of pulleys having their axes at an angle to each other were made straight, the belt would run off, while all attempts to hold the belt by means of guides cause such rapid wear of said belt as to be practically out of question. According to my invention I therefore make the face of one pulley, as E, concave and that of the other pulley, as D, convex, and make use of any suitable means for adjusting the belt laterally between the two pulleys to effect changes in the speed of the driven pulley. In the present example I have shown the belt made quite long in order to increase the life of the same, and support the same by means of two belt-pulleys M M'. These pulleys are preferably made adjustable in axial direction by securing their shafts N N' in a bar K, guided by fixed rods L L', and by a screw Z engaging the central part of the bar K and secured against longitudinal motion. If made short, the belt requires no guides and can be adjusted by any usual means. The belt F may pass over more or less of the periphery of the pulley E. It is evident that a series of shafts B, with a series of pulleys D, may be driven from one shaft A. In this case one weight and shaft Q may be used for simultaneously throwing all the pulleys D in and out of action; or separate weights and shafts may be used for each one or for any desirable number of pulleys D.

What I claim as new is—

1. A variable speed friction gear for shafts placed at an angle, consisting of two pulleys, the conical, co-operating faces of which are respectively convex and concave, a belt placed between said co-operating convex and concave faces, and means for forcing one pulley toward the other, substantially as described.

2. A variable speed friction gear for shafts placed at an angle, consisting of two pulleys, the conical, co-operating faces of which are respectively convex and concave, an adjustable belt placed between said co-operating convex and concave faces, and operative means for forcing one pulley toward the other, substantially as described.

3. A variable speed friction gear for shafts placed at an angle, consisting of two pulleys, the conical, co-operating faces of which are respectively convex and concave, one or more guide pulleys, a belt passing over the same and between said co-operating convex and concave faces of the driving and driven pulleys, and means for forcing the driving and driven pulleys together, substantially as described.

4. A variable speed friction gear for shafts placed at an angle, consisting of two pulleys, the conical, co-operating faces of which are respectively convex and concave, one or more guide pulleys, a belt passing over the same and between said co-operating convex and concave faces of the driving and driven pulleys, an adjustable guide, and means for forcing the driving and driven pulleys together, substantially as described.

5. A variable speed friction gear for shafts placed at an angle, consisting of two pulleys, the conical, co-operating faces of which are respectively convex and concave, one or more guide pulleys, a belt passing over the same and between said co-operating convex and concave faces of the driving and driven pulleys, a guide for the belt, operative means for moving the guide pulleys and the guide in the direction of the faces of the driving and driven pulleys, and means for forcing the driving and driven pulleys together, substantially as described.

6. A variable speed friction gear for shafts placed at an angle, consisting of a concave faced pulley on one of the shafts, a convex faced pulley on the other shaft, guide pulleys adjustable in the direction of the faces of the driving and driven pulleys, a belt passing over the same and between the driving and driven pulleys, a thrust bearing for one of the pulley shafts, a weighted shaft, and an operative connection between the latter and the bearing, substantially as described.

7. A variable speed friction gear for shafts placed at an angle, consisting of a concave faced pulley on one of the shafts, a convex faced pulley on the other shaft, guide pulleys adjustable in the direction of the faces of the driving and driven pulleys, a belt passing over the same and between the driving and driven pulleys, a thrust bearing for one of the pulley shafts longitudinally guided, a rack on said bearing, a weighted shaft, and a pinion on said shaft engaging the rack on the thrust bearing, substantially as described.

In testimony whereof I have signed my name to this specification in the presence of two subscribing witnesses.

CHRISTIAN SEYBOLD.

Witnesses:
FRIEDRICH CORRELL,
ZINNING DEBUS.